US012654377B2

(12) United States Patent (10) Patent No.: US 12,654,377 B2
Kozuka (45) Date of Patent: Jun. 16, 2026

(54) METHOD FOR SUPPORTING MOLDING OF PULVERIZED MATERIAL RESIN MATERIAL

(71) Applicant: NISSEI PLASTIC INDUSTRIAL CO., LTD., Nagano-ken (JP)

(72) Inventor: Makoto Kozuka, Hanishina-gun (JP)

(73) Assignee: NISSEI PLASTIC INDUSTRIAL CO., LTD., Nagano-ken (JP)

( * ) Notice: Subject to any disclaimer, the term of this patent is extended or adjusted under 35 U.S.C. 154(b) by 494 days.

(21) Appl. No.: 18/213,058

(22) Filed: Jun. 22, 2023

(65) Prior Publication Data

US 2023/0415393 A1 Dec. 28, 2023

(30) Foreign Application Priority Data

Jun. 23, 2022 (JP) ................................. 2022-100868

(51) Int. Cl.
*B29C 45/76* (2006.01)
*B29C 45/47* (2006.01)
(Continued)

(52) U.S. Cl.
CPC ............ *B29C 45/768* (2013.01); *B29C 45/47* (2013.01); *B29C 45/7693* (2013.01); *B29C 2945/761* (2013.01); *B29C 2945/76183* (2013.01); *B29C 2945/76187* (2013.01); *B29C 2945/76287* (2013.01); *B29C 2945/76331* (2013.01); *B29C 2945/76354* (2013.01); *B29C 2945/76929* (2013.01); *B29C 2945/76933* (2013.01); *B29C 2945/76936* (2013.01); *B29C 2945/76973* (2013.01); *B29K 2105/26* (2013.01);
(Continued)

(58) Field of Classification Search
CPC ....... B29C 45/47; B29C 45/76; B29C 45/768; B29C 45/7693; B29C 2945/761; B29C 2945/76183; B29C 2945/76187; B29C 2945/76287; B29C 2945/76331; B29C 2945/76354; B29C 2945/76929; B29C 2945/76933; B29C 2945/76936; B29C 2945/76973; B29K 2105/26; G01B 11/02; G01N 15/0205; G01N 2015/0294; G01N 2015/1493; G01N 2015/1497; G01N 21/84; G01N 21/85; G05B 2219/45244
USPC ...... 264/40.1, 328.1, 328.17, 349, 406, 408; 356/335, 628, 629; 382/141; 700/200
See application file for complete search history.

(56) References Cited

U.S. PATENT DOCUMENTS

2021/0248469 A1 8/2021 Yang et al.

FOREIGN PATENT DOCUMENTS

JP 7-304038 A 11/1995
JP 2007-125818 A 5/2007
(Continued)

*Primary Examiner* — Leo B Tentoni
(74) *Attorney, Agent, or Firm* — Birch, Stewart, Kolasch & Birch, LLP

(57) ABSTRACT

When a pulverized material resin material including a pulverized material as at least a part is plasticized and injection-molded by rotating a screw inserted in a heating tube, before use of the pulverized material, the area of a particle shape of the pulverized material in one direction is measured, a pulverized material shape index indicating the relative size of the area with respect to the depth of a screw groove is determined by computation processing, and when the size of the pulverized material shape index is equal to or greater than a preset setting value, the screw is determined to be inappropriate, and at least the result of the determination is displayed.

10 Claims, 9 Drawing Sheets

(51) Int. Cl.

| | | |
|---|---|---|
| *G01B 11/02* | (2006.01) | |
| *G01N 15/0205* | (2024.01) | |
| *G01N 21/84* | (2006.01) | |
| *G01N 21/85* | (2006.01) | |
| *B29K 105/26* | (2006.01) | |
| *G01N 15/02* | (2006.01) | |
| *G01N 15/14* | (2006.01) | |

(52) U.S. Cl.
CPC ................ *G01N 2015/0294* (2013.01); *G01N 2015/1493* (2013.01); *G01N 2015/1497* (2013.01); *G05B 2219/45244* (2013.01)

(56) References Cited

FOREIGN PATENT DOCUMENTS

| | | |
|---|---|---|
| JP | 2020-1183 A | 1/2020 |
| JP | 2021-121959 A | 8/2021 |

Figure 4:
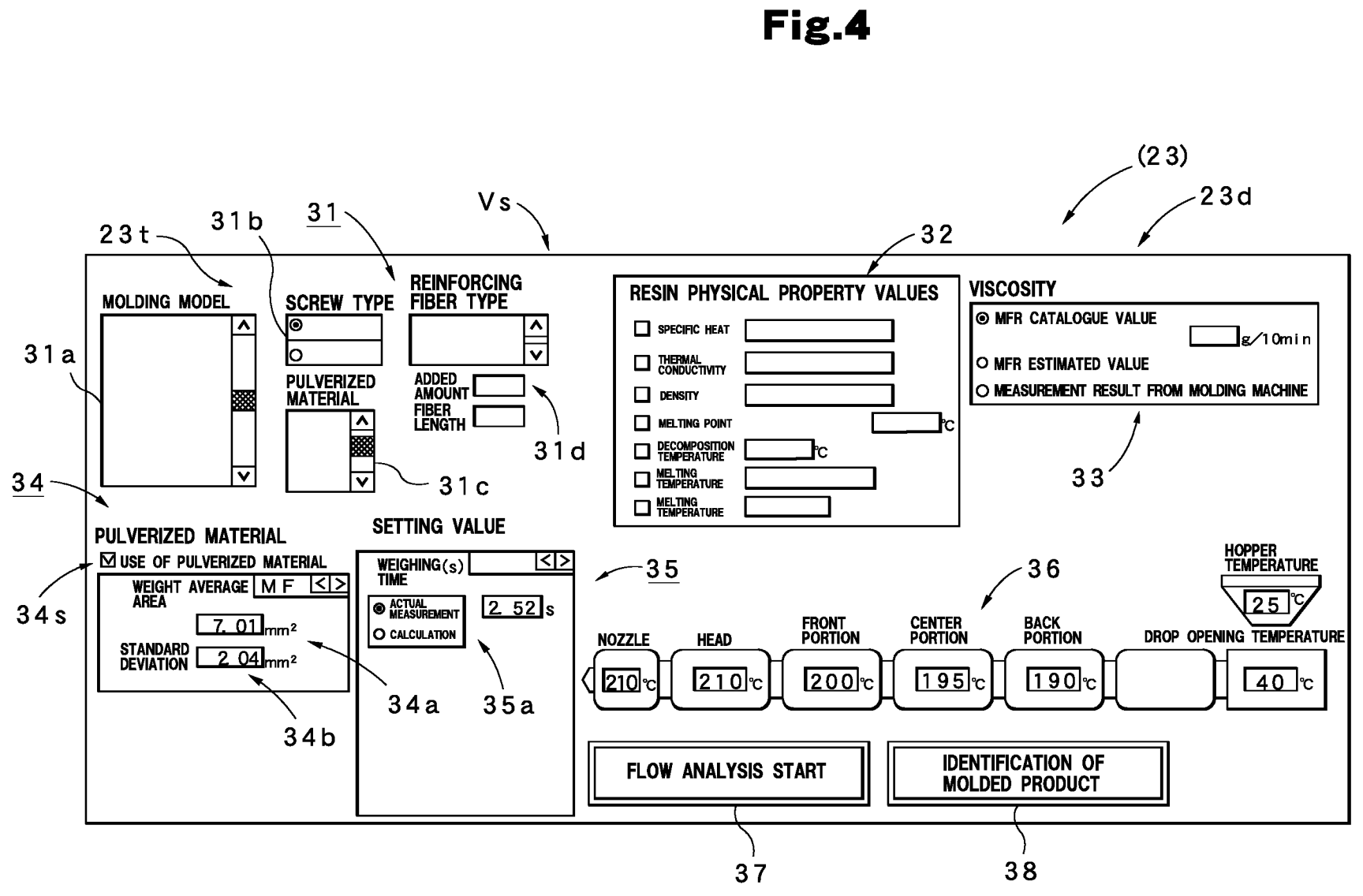

VISCOSITY
◉ MFR CATALOGUE VALUE
○ MFR ESTIMATED VALUE
○ MEASUREMENT RESULT FROM MOLDING MACHINE
☐ g/10min

33

32

RESIN PHYSICAL PROPERTY VALUES
☐ SPECIFIC HEAT
☐ THERMAL CONDUCTIVITY
☐ DENSITY
☐ MELTING POINT
☐ DECOMPOSITION TEMPERATURE
☐ MELTING TEMPERATURE
☐ MELTING TEMPERATURE

31

31d
REINFORCING FIBER TYPE
< >
ADDED AMOUNT
FIBER LENGTH

31c

31b
SCREW TYPE
◉ ○
PULVERIZED MATERIAL
< >

31a
MOLDING MODEL
< >

23t

34
PULVERIZED MATERIAL
☑ USE OF PULVERIZED MATERIAL  MF < >
WEIGHT AVERAGE AREA  7.01 mm²
STANDARD DEVIATION  2.04 mm²

34s

34b

34a

35
SETTING VALUE
WEIGHING(s) TIME  < >
2.52 s
◉ ACTUAL MEASUREMENT
○ CALCULATION

35a

HOPPER TEMPERATURE  25 °C
DROP OPENING TEMPERATURE  40 °C

36
NOZZLE 210°C  HEAD 210°C  FRONT PORTION 200°C  CENTER PORTION 195°C  BACK PORTION 190°C

38
IDENTIFICATION OF MOLDED PRODUCT

37
FLOW ANALYSIS START

METHOD FOR SUPPORTING MOLDING OF PULVERIZED MATERIAL RESIN MATERIAL

TECHNICAL FIELD

The present invention relates to a method for supporting the molding of a pulverized material resin material, and the method includes plasticizing and injection-molding a pulverized material resin material including a pulverized material as at least a part.

BACKGROUND ART

In general, in production plants and the like which use injection molding machines, not only virgin material serving as resin material for molding but also unneeded molded products such as sprues/runners and molding defects generated after molding are often reused. In this case, these unneeded molded products are finely pulverized to produce a pulverized material, the pulverized material is mixed with the virgin material (pellets) in a predetermined ratio and thus the resulting mixture is used as a pulverized material resin material.

Conventionally, as a molding means for utilizing the pulverized material resin material as described above to perform molding, a plastic molding mechanism disclosed in Patent Literature 1 and a resin molding device having the function of reusing sprues/runners disclosed in Patent Literature 2 are known.

The plastic molding mechanism disclosed in Patent Literature 1 is intended to provide a plastic molding mechanism in which a roughly pulverized material is mixed with a raw material stably and efficiently and a collected molded product is reused. Specifically, the plastic molding mechanism includes: a conveying means for directly conveying the collected molded product removed from a molding mold to above the material drop opening of a removal device; a means of rough pulverization which is arranged on the upper surface of a raw material feeding rate adjusting means fixed to an upper portion of the material drop opening so as to roughly pulverize the collected molded product that is conveyed; and the raw material feeding rate adjusting means which includes a through-hole for dropping the collected molded product roughly pulverized by the means of rough pulverization to the material drop opening and conveys a raw material to the through-hole while the feeding rate thereof is being adjusted so as to mix the collected molded product and the raw material.

The resin molding device disclosed in Patent Literature 2 is intended to eliminate the need for additionally providing, in a molding machine, a large-scale device for transporting the pulverized material of sprues/runners to simplify the configuration of the entire resin molding device and to facilitate cleaning when types are changed. Specifically, the resin molding device includes: a removal means for removing the sprues/runners from the resin molding position of the molding machine; and a pulverizer for pulverizing the sprues/runners removed by the removal means, and in the pulverizer, a pulverized material outlet is connected to the molding machine such that the pulverized material obtained by pulverizing the sprues/runners supplied from the removal means is supplied into the molding machine.

SUMMARY OF INVENTION

Technical Problem

However, the conventional molding means which use the pulverized material resin material described above have the following problems.

Specifically, in the pulverized material used, the shape and the size of individual particles are not uniform but random, and thus voids are easily generated in a molten resin within the screw of an injection molding machine at the time of plasticization. Consequently, insufficient melting of the resin and variations occur, and thus the molding quality is lowered and furthermore, an increase in the number of molding failures occurs, with the result that it is disadvantageously impossible to perform stable molding and production.

In particular, a relationship between the individual particle shapes of the pulverized material and the shape of the screw is important, and when the particle shape of the pulverized material is excessively large with respect to the depth of a screw groove, for example, plasticization is not sufficiently performed, and thus a plasticization time tends to be longer, with the result that there is a question as to whether the form of the screw used for plasticization is appropriate for the size of the particle shape of the pulverized material. Hence, when an inappropriate screw is used, plasticization processing is not sufficiently performed, and thus the molding quality and uniformization thereof are lowered, with the result that an increase in the number of molding defects is disadvantageously caused.

An object of the present invention is to provide a method for supporting the molding of a pulverized material resin material which solves the problems in the background art as described above.

Solution to Problem

In order to solve the problems described above, in a method for supporting the molding of a pulverized material resin material according to the present invention, when a pulverized material resin material Q including a pulverized material Qc as at least a part is plasticized and injection-molded by rotating a screw 3 inserted in a heating tube 2, before use of the pulverized material Qc, the area Ac of a particle shape Qcg of the pulverized material Qc in one direction is measured, a pulverized material shape index Ki indicating the relative size of the area Ac with respect to the depth Ds of a screw groove Gs is determined by computation processing and when the size of the pulverized material shape index Ki is equal to or greater than a preset setting value Ks, the screw 3 is determined to be inappropriate, and at least the result of the determination is displayed.

In this case, in a preferred aspect of the present invention, the area Ac can be measured by imaging the particle shape Qcg of the pulverized material Qc with an imaging unit 4 and performing image processing on an image signal obtained from the imaging unit 4. The pulverized material shape index Ki can be determined by a screw determination formula of [Formula 1] where Ac is the area of the particle shape Qcg of the pulverized material Qc, $\sigma$ is the standard deviation of the area Ac and Ds is the depth of the screw groove Gs.

$$Ki = \frac{\sqrt{Ac + 3\sigma}}{Ds} \ldots [\text{Screw determination formula}]$$

[Formula 1]

Here, when the result of the determination is inappropriate, an appropriate condition of the screw 3 can be displayed together with the result of the determination. On the other hand, the pulverized material Qc is preferably mixed with a virgin material Qp in a predetermined ratio to be used. When the pulverized material Qc and the virgin material Qp are mixed to be used, the bulk densities of the virgin material Qp and the pulverized material Qc are previously measured, based on pulverized material bulk density data Dc related to the bulk density of the pulverized material Qc, and virgin material bulk density data Dp related to the bulk density of the virgin material Qp obtained by the measurement, a conversion coefficient Kc for a predetermined molding condition when the virgin material Qp and the pulverized material Qc are mixed in the predetermined ratio is determined and registered. When the pulverized material Qc is used, at least the bulk density of the pulverized material Qc which is used is measured and based on the pulverized material bulk density data Dc, the virgin material bulk density data Dp obtained by the measurement, and the conversion coefficient Kc, processing for modifying the molding condition can be performed. The measurement of the bulk density can be performed by utilizing the function of a molding machine M. The conversion coefficient Kc can be corrected by one or two or more of the area Ac of the pulverized material Qc, the dimension (Vc, Wc) of the pulverized material Qc and the shape of the screw 3.

Advantageous Effects of Invention

In the method for supporting the molding of a pulverized material resin material according to the present invention as described above, the following remarkable effects are achieved.

(1) Even when the pulverized material Qc in which the size (the area Ac) of the particle shape Qcg is not constant but random is used, it is possible to rapidly and accurately determine whether or not a relationship between the pulverized material Qc used and the screw 3 is appropriate. In this way, the use of an inappropriate screw 3 is avoided, a failure caused by the use of the inappropriate screw 3, that is, a failure caused by insufficient plasticization processing is eliminated and thus it is possible to enhance the molding quality and uniformization thereof and to reduce molding failures.

(2) In a preferred aspect, when the area Ac is determined, the particle shape Qcg of the pulverized material Qc is imaged with the imaging unit 4, the image processing is performed on the image signal obtained from the imaging unit 4 and thus the area Ac is measured. In this way, for example, structurally, only by additionally providing a camera or the like for imaging the pulverized material Qc in the vicinity of a hopper, it is possible to easily achieve this structure, and by the image processing on the image signal, it is possible to rapidly measure the particle shape Qcg.

(3) In a preferred aspect, when the pulverized material shape index Ki is determined, the pulverized material shape index Ki is determined by the screw determination formula where the standard deviation of the area Ac is 6. In this way, for example, it is possible to more easily determine the pulverized material shape index Ki by a relatively simple computation formula, that is, it is possible to rapidly obtain the intended pulverized material shape index Ki.

(4) In a preferred aspect, when the result of the determination is inappropriate, the appropriate recommended condition of the screw is displayed together with the result of the determination. In this way, a user can grasp that the screw 3 being used is inappropriate and can also know the information related to the appropriate condition of the screw, with the result that it is possible to rapidly and accurately select and replace the screw 3.

(5) In a preferred aspect, when the pulverized material Qc is used, the pulverized material Qc is mixed with the virgin material Qp in the predetermined ratio to be used. In this way, this method can be applied to the pulverized material resin material Q which is actually used by mixing the pulverized material Qc in the predetermined ratio, with the result that this method can be effectively utilized for molding using the pulverized material Qc.

(6) In a preferred aspect, when the pulverized material Qc and the virgin material Qp are mixed to be used, the bulk densities of the virgin material Qp and the pulverized material Qc are previously measured, based on the pulverized material bulk density data Dc related to the bulk density of the pulverized material Qc and the virgin material bulk density data Dp related to the bulk density of the virgin material Qp obtained by the measurement, the conversion coefficient Kc for the predetermined molding condition when the virgin material Qp and the pulverized material Qc are mixed in the predetermined ratio is determined and registered. When the pulverized material Qc is used, at least the bulk density of the pulverized material Qc which is used is measured, and based on the pulverized material bulk density data Dc, the virgin material bulk density data Dp obtained by the measurement, and the conversion coefficient Kc, the processing for modifying the molding condition is performed. In this way, even when the pulverized material Qc having random particle shapes Qcg and sizes (areas Ac) is mixed with the virgin material Qp to be used, it is possible to avoid insufficient melting and variations to stabilize the molten state of the resin. Thus, it is possible to enhance and uniformize the molding quality, to further reduce molding failures and to stabilize production without the occurrence of a production delay. Moreover, for example, even a user who does not have specialized knowledge can easily perform this method.

(7) In a preferred aspect, when the measurement of the bulk density is performed, the function of the molding machine M is utilized to perform the measurement, and thus it is not necessary to additionally prepare a large-scale measurement device and the like, with the result that this method can be performed at low cost even at a small-scale production plant or the like. Specifically, the pulverized material Qc or the virgin material Qp is fed into the hopper 5 of the molding machine M, the shutter 6 is closed when the pulverized material Qc or the virgin material Qp is fed at least to a position of the hopper 5 above the shutter 6 and thereafter the screw 3 is rotated to measure the weight of a resin Qpr, Qcr in a drooling state which is discharged from the nozzle 7, with the result that this method described above can be realized. As described above, the injection molding machine M which is used in the actual production and is owned by the user can be directly utilized, with the result that the user can make the measurement more easily and rapidly by the operation of the injection molding machine M itself.

(8) In a preferred aspect, when the conversion coefficient Kc is corrected by one or two or more of the area Ac of the pulverized material Qc, the dimension (Vc, Wc) of the pulverized material Qc and the shape of the screw 3, the conversion coefficient Kc can be finely adjusted by physical elements which are easily affected, with the result that it is possible to further optimize molding conditions or molding conditions related thereto in terms of fine adjustment. In particular, since the area Ac of the pulverized material Qc, the dimension (Vc, Wc) of the pulverized material Qc and the shape of the screw 3 are data which can be previously obtained by performing the molding supporting method according to the present embodiment, they can be utilized without being processed.

BRIEF DESCRIPTION OF DRAWINGS

FIG. 2 is a configuration diagram showing the mechanical structure of an injection molding machine which can perform the molding supporting method described above;

FIG. 4 is a setting screen diagram in a display included in the injection molding machine which can perform the molding supporting method;

DESCRIPTION OF EMBODIMENTS

A preferred embodiment according to the present invention will then be described in detail with reference to drawings.

In order to facilitate the understanding of a method for supporting the molding of a pulverized material resin material according to the present embodiment, an outline of the configuration of an injection molding machine M which can utilize the molding supporting method will first be described with reference to FIGS. 2 to 5 and 7.

Figure 2:
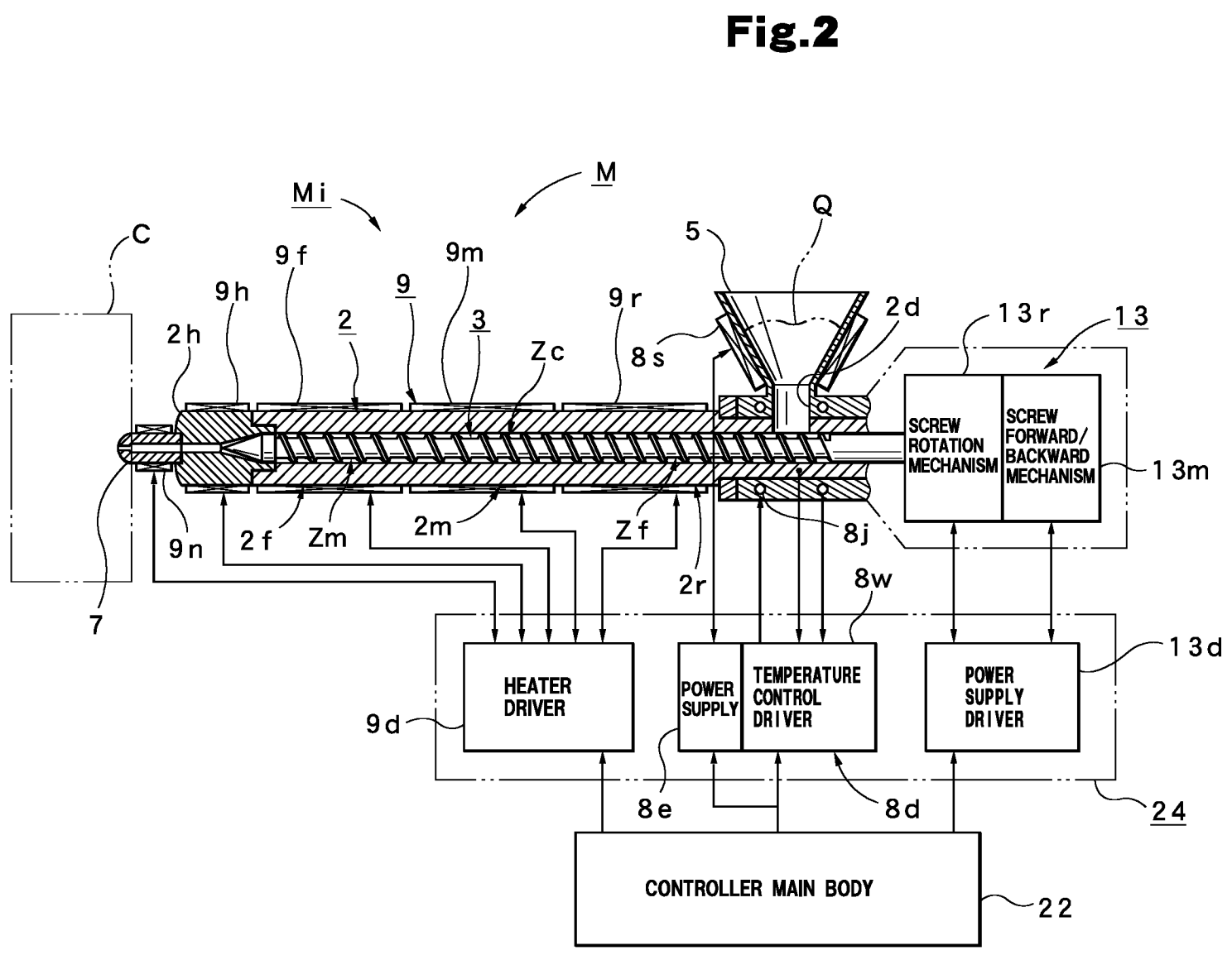

FIG. 2 shows the injection molding machine M, and in particular an injection device Mi in which a mold clamping device is omitted. In the injection device Mi, reference sign 2 represents a heating tube, and the heating tube 2 includes a nozzle 7 at a front end portion via a head portion 2h. The nozzle 7 has the function of injecting a molten resin within the heating tube 2 to a mold C indicated by virtual lines.

Figure 7:
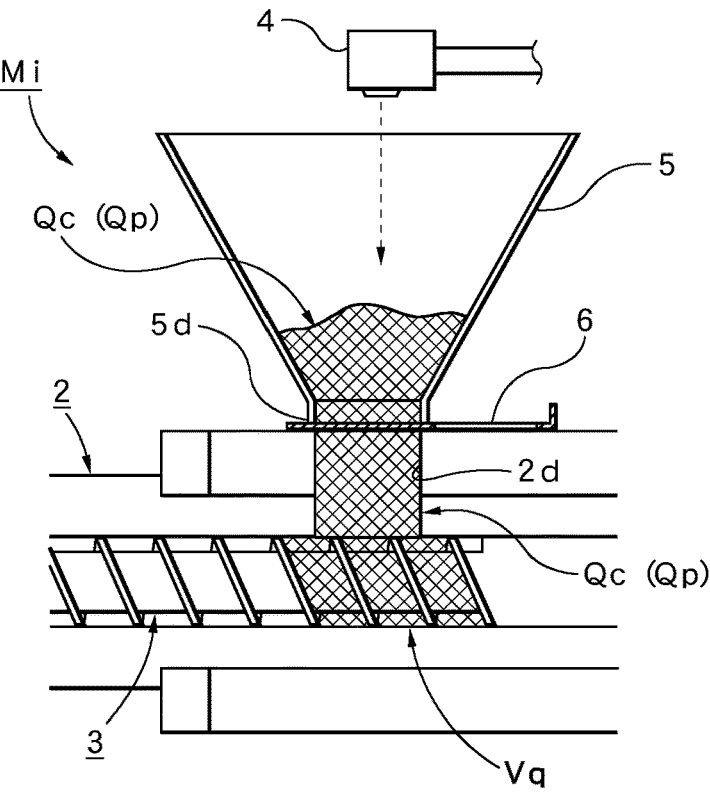
FIG. 7 is a step illustrative diagram showing a part of the molding supporting method.

On the other hand, a hopper 5 is provided above around a back end of the heating tube 2. As shown in FIG. 7, a lower end opening 5d of the hopper 5 communicates with the interior of the heating tube 2 through a material drop opening 2d which is formed to penetrate to the heating tube 2. In this way, the pulverized material resin material Q within the hopper 5 is supplied through the material drop opening 2d into the heating tube 2. In the lower end opening 5d, a shutter 6 which opens and closes the lower end opening 5d is further provided. The shutter 6 is displaced to a position on a right side (back side of the injection molding machine M) shown in FIG. 7 so as to enter a fully closed position in which the lower end opening 5d is blocked whereas the shutter 6 is displaced to a position on a left side (front side of the injection molding machine M) so as to enter a fully opened position in which the lower end opening 5d is opened. The pulverized material resin material Q is a resin material in which a virgin material Qp and a pulverized material Qc are mixed in a predetermined ratio.

In FIG. 2, reference sign 8s represents a heater which is provided on the outer circumferential surface of the hopper 5 to heat the resin material Q stored within the hopper 5, and reference sign 8j represents a water jacket which is formed around the material drop opening 2d in the heating tube 2. The heater 8s is connected to a power supply circuit 8e in a temperature control driver 8d, and the water jacket 8j is connected to a temperature-controlled water circulation circuit 8w in the temperature control driver 8d. The temperature-controlled water circulation circuit 8w circulates a temperature-controlled water medium (hot water or cooling water) to the water jacket 8j, and thereby can control the temperature of (heating or cooling) the resin material Q which passes through the material drop opening 2d. Furthermore, the power supply circuit 8e and the temperature-controlled water circulation circuit 8w are connected respectively to a controller main body 22. In this way, control commands for the power supply circuit 8e and the temperature-controlled water circulation circuit 8w are fed from the controller main body 22 to the temperature control driver 8d.

A screw 3 is loaded inside the heating tube 2 so as to be rotatable and movable forward and backward. The surface of the screw is coated with a predetermined surface material (metal) with consideration given to durability and the like. The screw 3 has a metering zone Zm, a compression zone Zc and a feed zone Zf from the front side to the back side. On the other hand, a back end portion of the screw 3 is coupled to a screw driving portion 13. The screw driving portion 13 includes a screw rotation mechanism 13r which rotates the screw 3 and a screw forward/backward mechanism 13m which moves the screw 3 forward and backward. Although in an example shown in the figure, as the driving method of the screw rotation mechanism 13r and the screw forward/backward mechanism 13m, an electrical method using an electric motor is shown, a hydraulic method using a hydraulic circuit may be used, and the driving method is not limited. The screw rotation mechanism 13r and the screw forward/backward mechanism 13m are connected to a power supply driver 13d, and the power supply driver 13d is connected to the controller main body 22. In this way, control commands for the screw rotation mechanism 13r and the screw forward/backward mechanism 13m are fed from the controller main body 22 to the power supply driver 13d. Physical quantities such as the speed and the position of the screw 3 are detected by a speed sensor, a position sensor and the like which are not shown in the figure, and the detection signals thereof are fed to the power supply driver 13d.

The heating tube 2 further includes, from the front side to the back side, a heating tube front portion 2*f*, a heating tube center portion 2*m* and a heating tube back portion 2*r*, and on the outer circumferential surfaces of the heating tube front portion 2*f*, the heating tube center portion 2*m* and the heating tube back portion 2*r*, a front portion heating portion 9*f*, a center portion heating portion 9*m* and a back portion heating portion 9*r* are respectively provided. Likewise, on the outer circumferential surface of the head portion 2*h*, a head heating portion 9*h* is provided, and on the outer circumferential surface of the nozzle 7, a nozzle heating portion 9*n* is provided. Each of the heating portions 9*f*, 9*m*, 9*r*, 9*h* and 9*n* can be formed with a hand heater or the like. Hence, the nozzle heating portion 9*n*, the head heating portion 9*h*, the front portion heating portion 9*f*, the center portion heating portion 9*m* and the back portion heating portion 9*r* constitute a heating group portion 9. The heating group portion 9 is connected to a heater driver 9*d*, and the heater driver 9*d* is connected to the controller main body 22. In this way, control commands for the heating portions 9*f*, 9*m*, 9*r*, 9*h* and 9*n* are fed from the controller main body 22 to the heater driver 9*d*, and heating temperatures are detected with temperature sensors (such as thermocouples) which are not shown in the figure, and the detection signals thereof are fed to the heater driver 9*d*.

Figure 3:
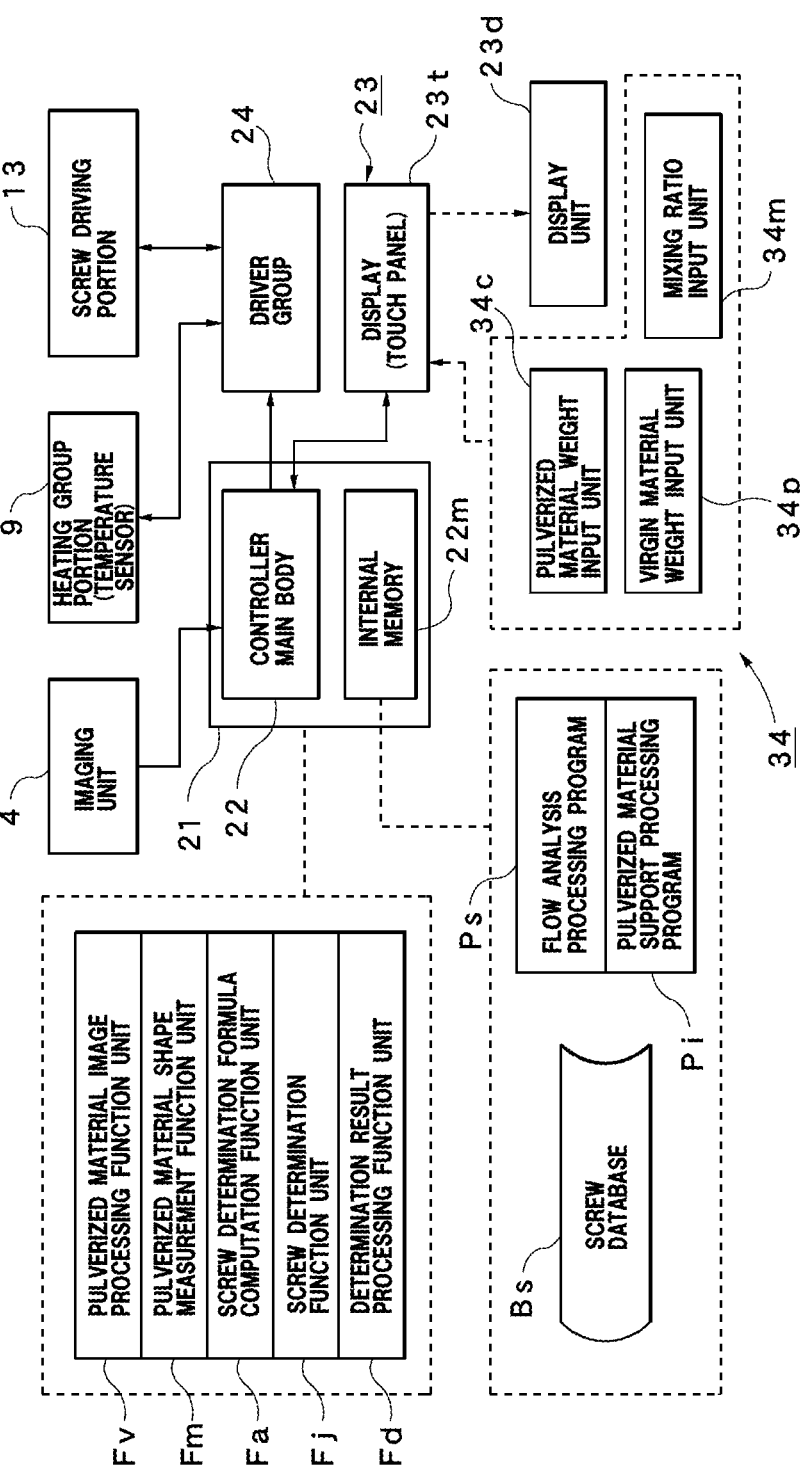
FIG. 3 is a block diagram of a processing system (control system) in the injection molding machine which can perform the molding supporting method.

On the other hand, FIG. 3 shows a molding machine controller 21 which comprehensively controls the injection molding machine M. The molding machine controller 21 includes the controller main body 22 which has the function of a computer incorporating hardware such as a CPU and an internal memory 22*m*, and a display 23 is connected to the controller main body 22. The display 23 includes a display unit 23*d* which produces a necessary information display and also includes a touch panel 23*t*, and various types of input operations such as inputs, settings and selections can be performed with the touch panel 23*t*. A driver group 24 which drives (operates) various types of actuators is connected to the controller main body 22. The driver group 24 includes the temperature control driver 8*d* including the power supply circuit 8*e* and the temperature-controlled water circulation circuit 8*w* shown in FIG. 2, the power supply driver 13*d* and the heater driver 9*d*.

Hence, the molding machine controller 21 contains an HMI control system and a PLC control system, and a PLC program and an HMI program are stored in the internal memory 22*m*. By the PLC program, sequence operations in various types of steps in the injection molding machine M, the monitoring of the injection molding machine M and the like are executed, and by the HMI program, the setting and display of operation parameters for the injection molding machine M, the display of operation monitoring data for the injection molding machine M and the like are executed.

Figure 5:
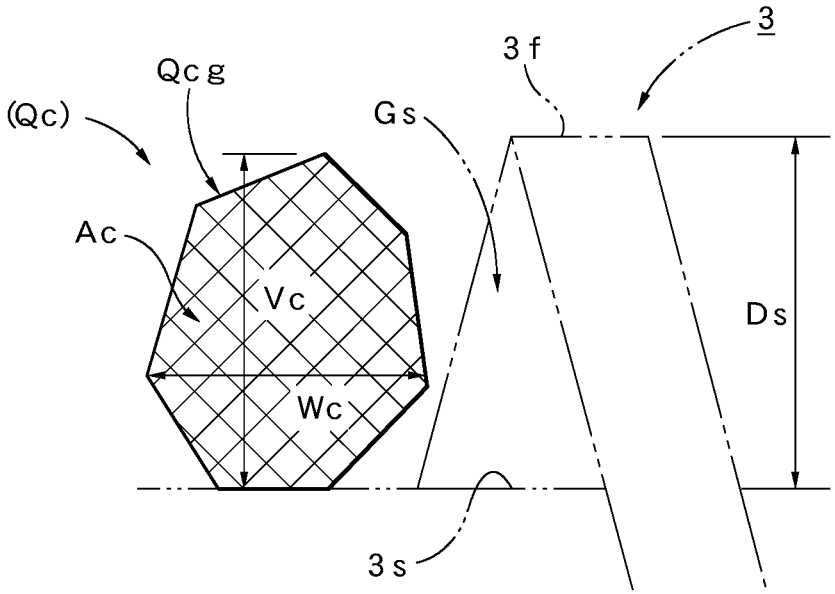
FIG. 5 is an illustrative diagram showing a relationship between the area of the particle shape of a pulverized material used in the molding supporting method and the depth of a screw groove.

In the internal memory 22*m* added to the controller main body 22, application programs which realize the molding supporting method according to the present embodiment of the present invention, that is, a flow analysis processing program Ps and a pulverized material support processing program Pi are stored, and a screw database Bs related to various types of screws and more specifically, various types of screws 3 corresponding to the depth Ds of the screw groove Gs shown in FIG. 5 are provided. In this way, the molding machine controller 21 realizes a pulverized material image processing function unit Fv, a pulverized material shape measurement function unit Fm, a screw determination formula computation function unit Fa, a screw determination function unit Fj and a determination result processing function unit Fd serving as main function units related to the molding supporting method.

Furthermore, FIG. 4 shows a setting screen Vs which is displayed on the display 23. In FIG. 4, on the setting screen Vs, a molding machine and resin setting column 31 is arranged in an upper left portion, a resin physical property value setting column 32 is arranged in an upper center portion, a viscosity setting column 33 is arranged in an upper right portion, a pulverized material setting column 34 and a setting value input unit 35 are arranged in a lower left portion and a temperature setting column 36 is arranged from a lower center portion to a lower right portion. Moreover, a "flow analysis start" key 37 and a "molded product identification" key 38 are arranged below the temperature setting column 36. In this case, in the molding machine and resin setting column 31, a molding model setting unit 31*a*, a screw type setting unit 31*b*, a resin type setting unit 31*c* and a reinforcing fiber type setting unit 31*d* are provided, and in the resin physical property value setting column 32, input units for various types of detailed physical property values such as a specific heat, a thermal conductivity, a density, a melting point, a decomposition temperature, a melting temperature and a water absorption rate are provided.

In the pulverized material setting column 34, a selection unit 34*s* for the use of the pulverized material which selects whether or not the pulverized material is used and a weight average area display unit 34*a* and a standard deviation display unit 34*b* are provided, and in the setting value input unit 35, at least a weighing time input unit 35*a* is included.

An outline of the molding supporting method according to the present embodiment which can be performed by the utilization of the injection molding machine M as described above will then be described with reference to FIGS. 5 to 8 and 10.

In general, in the pulverized material Qc used in the pulverized material resin material Q, individual particle shapes Qcg and sizes are random, and thus voids are easily generated in the molten resin within the screw 3 of the injection molding machine M at the time of plasticization. Consequently, insufficient melting of the resin and variations occur, and thus the molding quality and uniformization are lowered and furthermore, an increase in the number of molding failures occurs, with the result that it is disadvantageously impossible to perform stable molding and production.

In particular, as shown in FIG. 5, a relationship between the depth Ds of the screw groove Gs and the size of the particle shape Qcg of the pulverized material Qc is important, and when the particle shape Qcg is excessively large with respect to the depth Ds, that is, when the area Ac of the particle shape Qcg in one direction is excessively large, a plasticization time tends to be longer, with the result that there is a question as to whether a relationship between the size of the particle shape Qcg and the form of the screw 3 for plasticization processing is appropriate. In FIG. 5, reference sign 3*f* represents the flight portion of the screw 3, and reference sign 3*s* represents the screw shaft portion of the screw 3.

Hence, in the molding supporting method according to the present embodiment, a pulverized material shape index Ki indicating a relative size of the area Ac of the particle shape Qcg of the pulverized material Qc in one direction with respect to the depth Ds of the screw groove Gs is used, before use of the pulverized material Qc, the area Ac of the particle shape Qcg of the pulverized material Qc in one direction is measured, the pulverized material shape index Ki is determined by computation processing using the area Ac obtained and when the size of the pulverized material shape index Ki is equal to or greater than a preset setting value Ks, the screw 3 is determined to be inappropriate, and at least the result of the determination is displayed.

In this case, in the particle shape Qcg of the pulverized material Qc shown as an example in FIG. 5, the area which is viewed in one direction is Ac [square mm], the length in a vertical direction is Vc [mm] and the length in a lateral direction is We [mm]. The area which is viewed in the one direction can be obtained by the pulverized material image processing function unit Fv and the pulverized material shape measurement function unit Fm. Specifically, by the function of the pulverized material image processing function unit Fv, as shown in FIG. 7, the pulverized material Qc fed into the hopper 5 is imaged with an imaging unit 4 using a camera or the like, and thus it is possible to identify, from a two-dimensional image signal, the particle shape Qcg viewed in the one direction by image processing. Here, the number of measurements on the particle shape Qcg is maximized, and thus variations can be minimized. In the embodiment, the number of measurements (number of samples) is "100". The area Ac of the particle shape Qcg can be obtained by the function of the pulverized material shape measurement function unit Fm. Specifically, since the particle shape Qcg is identified, the external dimensions of the particle shape Qcg are measured by image processing, and necessary computation processing is performed, with the result that the area Ac [square mm] can be obtained.

As described above, when the area Ac is determined, the particle shape Qcg of the pulverized material Qc is imaged with the imaging unit 4, the image processing is performed on the image signal obtained from the imaging unit 4 to measure the particle shape Qcg. In this way, for example, structurally, only by additionally providing a camera or the like for imaging the pulverized material Qc in the vicinity of the hopper, it is possible to easily achieve this structure, and by the image processing on the image signal, it is possible to rapidly measure the particle shape Qcg.

Figure 10:
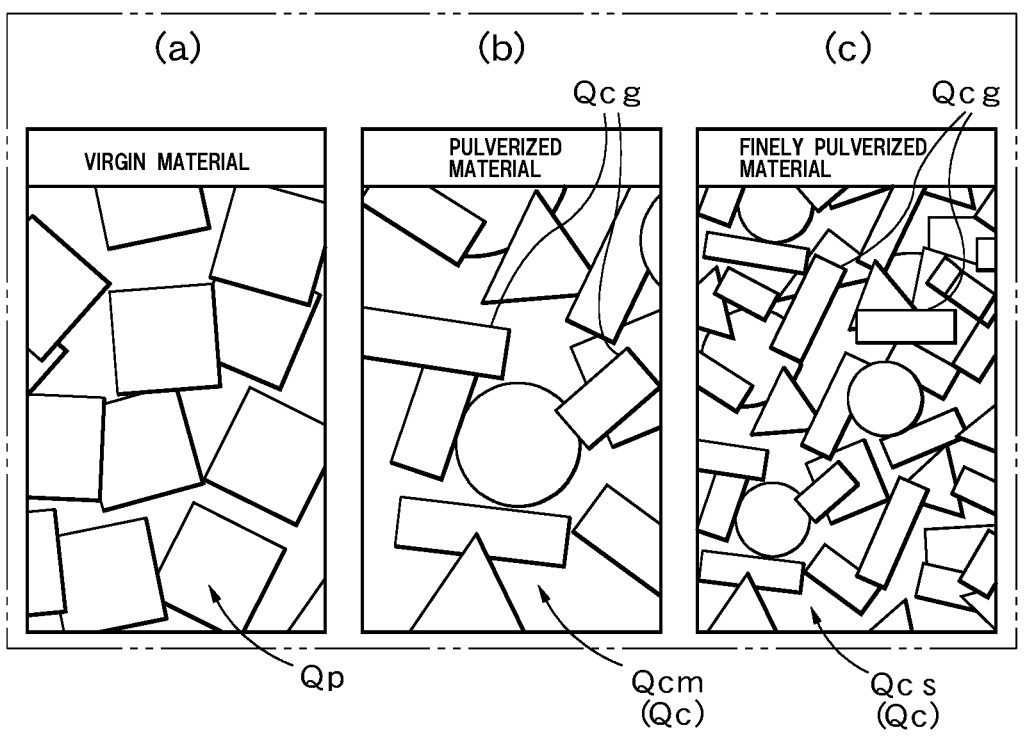
FIG. 10 is an illustrative diagram showing a pulverized material and a virgin material used in the molding supporting method according to the modified embodiment.

FIG. 10 shows a specific image of the virgin material Qp and the pulverized material Qc (Qcm, Qcs). FIG. 10(a) shows pellets of the virgin material Qp. The pellets have a substantially constant particle shape. FIG. 10(b) shows the pulverized material Qc (Qcm) of a standard size obtained by pulverizing sprues/runners and the like, and the pulverized material Qc has random particle shapes Qcg. FIG. 10(c) shows the pulverized material (finely pulverized material) Qc (Qcs) in which the material is finely pulverized, and the pulverized material Qc has similar random particle shapes Qcg.

In the virgin material Qp, the pulverized material Qcm and the finely pulverized material Qcs shown in FIGS. 10(a), 10(b) and 10(c), the loose bulk density [kg/liter], the area Ac [square mm] of the particle shape Qcg and the standard deviation 6 [square mm] of the area Ac [square mm] are shown in [Table 1].

TABLE 1

| | Virgin material FIG. 10(a) | Pulverized material FIG. 10(b) | Finely pulverized material FIG. 10(c) |
|---|---|---|---|
| Loose bulk density | 0.674 | 0.416 | 0.466 |
| Area Ac | 9.04 | 14.81 | 6.36 |
| Area standard deviation σ | 1.40 | 4.75 | 2.78 |

The pulverized material shape index Ki indicating the relative size of the area Ac of the particle shape Qcg with respect to the depth Ds of the screw groove Gs can be determined by computation processing. In the present embodiment, as the pulverized material shape index Ki, a screw determination formula shown in [Formula 2] is used.

$$Ki = \frac{\sqrt{Ac + 3\sigma}}{Ds} \text{ ...[Screw determination formula]} \qquad \text{[Formula 2]}$$

In the screw determination formula of [Formula 2], As is the area of the particle shape Qcg of the pulverized material Qc, σ is the standard deviation of the area Ac and Ds is the depth of the screw groove Gs. The pulverized material shape index Ki is determined by the screw determination formula as described above, and thus, for example, it is possible to more easily determine the pulverized material shape index Ki by a relatively simple computation formula, that is, it is possible to rapidly obtain the intended pulverized material shape index Ki. The computation processing for determining the pulverized material shape index Ki by the screw determination formula is the function of the screw determination formula computation function unit Fa described above.

Figure 6:
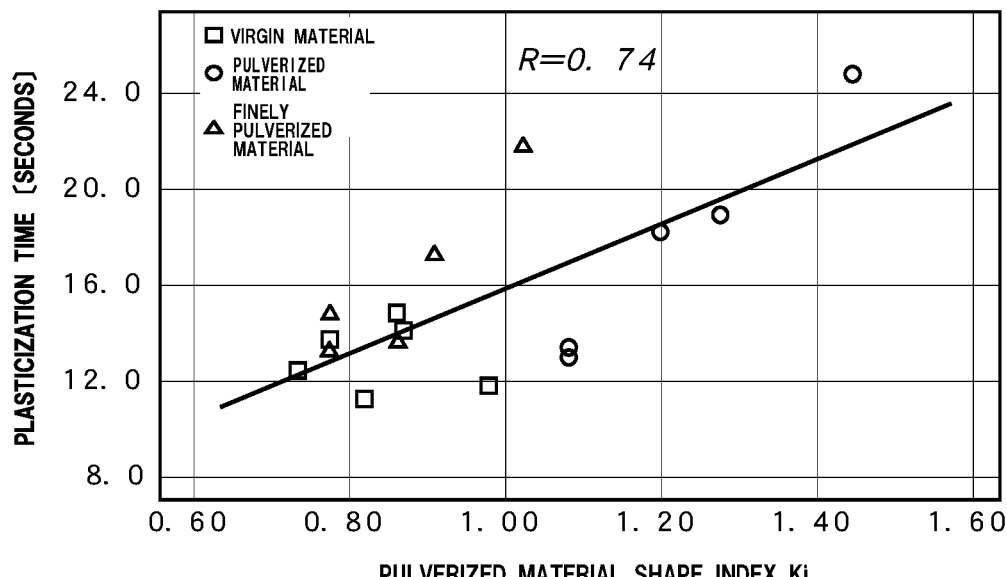
FIG. 6 is a correlation characteristic chart showing a relationship between the result of a screw determination formula used in the molding supporting method and a plasticization time.

FIG. 6 shows a correlation characteristic chart showing a relationship between the result of the pulverized material shape index Ki obtained by the screw determination formula and the plasticization time [seconds]. As is clear from FIG. 6, as the value of the pulverized material shape index Ki is increased, the plasticization time is longer. FIG. 6 shows the result of the measurement of the plasticization time [seconds] when the form (the shape and the area) of the pulverized material Qc and the depth Ds of the screw groove Gs are changed for each sample, and thus the value of the pulverized material shape index Ki is made different. The resulting correlation coefficient is R=0.74.

As is clear from FIG. 6, it has been confirmed that when the pulverized material shape index Ki drops below "0.85", regardless of the area Ac and the shape of the pulverized material Qc (particle shape Qcg), substantially similar plasticization times can be obtained. Hence, in the present embodiment, the setting value Ks for determining the pulverized material shape index Ki is set to "1.0". Therefore, in the screw determination function unit Fj described above, the setting value Ks is previously set, and when the size (computation value) of the pulverized material shape index Ki obtained by the screw determination formula is equal to or greater than the setting value Ks, the screw 3 is determined to be inappropriate.

Figure 8:
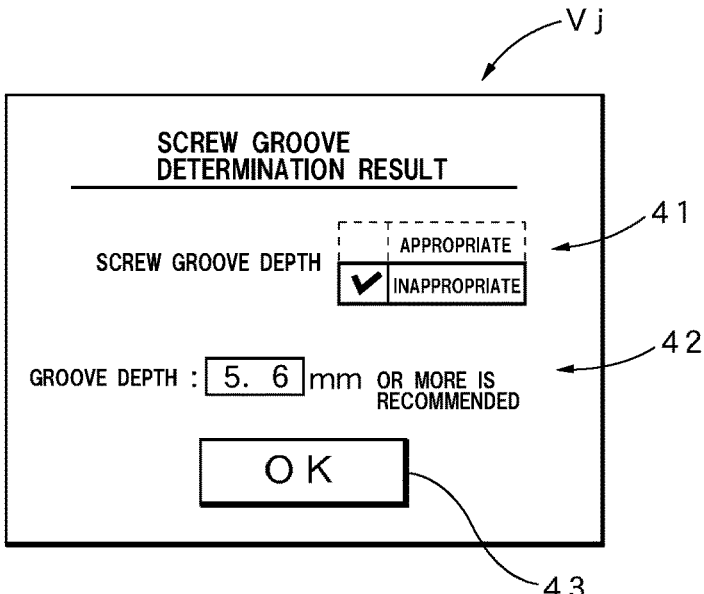
FIG. 8 is a determination result display screen diagram showing the result of a determination made by the molding supporting method.

Furthermore, the result of the determination is displayed by the function of the determination result processing function unit Fd described above with the display unit 23d of the display 23. FIG. 8 shows an example of a determination result display screen Vj. On the determination result display screen Vj, whether or not the result of the determination is inappropriate is displayed, and when the result of the determination is inappropriate, a screw having the depth Ds of a screw groove Gs which is allowable is selected from the screw database Bs, and the value [mm] of the depth Ds of the screw groove Gs for a recommended screw 3 is displayed.

As described above, when the result of the determination is inappropriate, the appropriate condition of the screw 3 is displayed together with the result of the determination, and thus the user can grasp that the screw 3 being used is inappropriate and can also know the information related to the appropriate condition of the screw 3, with the result that it is possible to rapidly and accurately select and replace the screw 3.

A processing procedure of the method for supporting the molding of a pulverized material resin material according to the present embodiment will then be described with reference to drawings according to a flowchart shown in FIG. 1.

Unneeded molded products such as sprues/runners and molding defects generated after production (molding) are first pulverized with an unillustrated pulverizer or the like, and thus the pulverized material Qc which is used is produced (step S1). In the embodiment, a case where the pulverized material Qcm shown in FIG. 10(*b*) described above is produced is assumed.

Then, as shown in FIG. 7, the pulverized material Qcm produced is fed into the hopper 5 in which the shutter 6 is in the fully opened position (step S2). In this way, the pulverized material Qcm is accumulated in a certain range of the screw 3 located below the material drop opening 2*d* and furthermore, the lower end opening. Thereafter, when the pulverized material Qcm is gradually accumulated, and the upper surface of the pulverized material Qcm reaches a specified position above the shutter 6, the shutter 6 is switched to the fully closed position (steps S3 and S4). This state is the state of FIG. 7.

Then, the imaging unit 4 such as a camera is moved from an unillustrated release position to a use position located above the hopper 5 shown in FIG. 7, and after a necessary focus adjustment and the like are made, the upper surface of the pulverized material Qcm within the hopper 5 is imaged (step S5). Image signals obtained by the imaging unit 4 are supplied to the controller main body 22, and particle shapes Qcg are recognized by the image processing of the pulverized material image processing function unit Fv (step S6). By the pulverized material shape measurement function unit Fm, the external dimensions of the particle shapes Qcg are measured (step S7).

Then, when the result of the measurement is obtained, necessary computation processing is performed to determine the areas Ac [square mm] of the particle shapes Qcg (average value) and the standard deviation 6 of the areas Ac [square mm]. Since the depth Ds of the screw groove Gs related to the screw 3 being used is known (registered), the computation processing using the screw determination formula of [Formula 2] described above is performed, and thus the pulverized material shape index Ki is determined (step S8).

When the pulverized material shape index Ki is obtained, a determination for comparison with the setting value Ks is performed (step S9). In the case shown as an example, from [Table 1] described above, the area Ac is 14.81 [square mm], and the standard deviation 6 is 4.75 [square mm]. Hence, when the depth Ds of the screw groove Gs is 5.39 [mm], the pulverized material shape index Ki is 1.0 (=setting value Ks). Therefore, when the depth Ds of the screw groove Gs is equal to or less than 5.39 [mm], the pulverized material shape index Ki is equal to or greater than "1.0", and thus the screw 3 is determined to be inappropriate whereas when the depth Ds of the screw groove Gs is less than 5.39 [mm], the pulverized material shape index Ki is less than "1.0", and thus the screw 3 is determined to be appropriate (step S10).

Here, a case where the result of the determination is inappropriate is assumed. In this case, on the display unit 23*d* of the display 23, the determination result display screen Vj shown in FIG. 8 is displayed, and thus a display of "inappropriate" is produced by a determination display unit 41 (step S11). On a recommended screw display unit 42, the recommended screw selected from the screw database Bs is displayed. FIG. 8 shows, as an example, the screw 3 with the depth Ds of the screw groove Gs being equal to or greater than "5.6" mm (step S12). In the figure, reference sign 43 represents a confirmation button.

Hence, the user preferably checks the determination result display screen Vj to replace the screw 3 with an appropriate screw, that is, the recommended screw (step S13). In this way, normal molding (production) processing can be performed (steps S14 and S15).

Thus, in the molding supporting method according to the present embodiment as described above, as a basic method, before use of the pulverized material Qc, the area Ac of the particle shape Qcg of the pulverized material Qc in one direction is measured, the pulverized material shape index Ki indicating the relative size of the area Ac with respect to the depth Ds of the screw groove Gs is determined by the computation processing and when the size of the pulverized material shape index Ki is equal to or greater than the preset setting value Ks, the screw 3 is determined to be inappropriate, and at least the result of the determination is displayed. Therefore, even when the pulverized material Qc in which the particle shapes Qcg and the sizes (the area Ac) are not constant but random is used, it is possible to rapidly and accurately determine whether or not the relationship between the pulverized material Qc used and the screw 3 is appropriate.

In this way, the use of an inappropriate screw 3 is avoided, a failure caused by the use of the inappropriate screw 3, that is, a failure caused by insufficient plasticization processing is eliminated and thus it is possible to enhance the molding quality and uniformization thereof and to reduce molding failures.

On the other hand, when in the determination of step S10 described above, the screw 3 is determined to be appropriate, the screw 3 is used without being changed, and thus normal molding (production) processing can be performed (steps S10, S16 and S14).

Incidentally, as shown in FIGS. 10(*b*) and 10(*c*), in the pulverized material Qc used, the individual particle shapes Qcg and sizes thereof are random, and in actual production steps, the particle shape Qcg and the virgin material Qp (FIG. 10(*a*)) are often mixed in the predetermined ratio to be used.

Hence, in the molding supporting method according to the present embodiment, at a production site such as a molding plant, the user can easily and accurately grasp the degree of the bulk density of the pulverized material Qc and can directly reflect the degree of the bulk density on the molding condition at the time of production.

Specifically, the injection molding machine M included in the molding plant or the like is utilized, and thus the bulk density of the pulverized material Qc used can be measured easily and rapidly, and by the result of the measurement, the molding condition can be modified so as to match with the pulverized material resin material Q which is actually used and in which the virgin material Qp and the pulverized material Qc are mixed (steps S16 and S17). As described above, when the pulverized material Qc is used, the pulverized material Qc is mixed with the virgin material Qp in the predetermined ratio to be used, and thus this method can be applied to the pulverized material resin material Q which is actually used by mixing the pulverized material Qc in the predetermined ratio, with the result that this method can be effectively utilized for molding using the pulverized material Qc.

Figure 9:
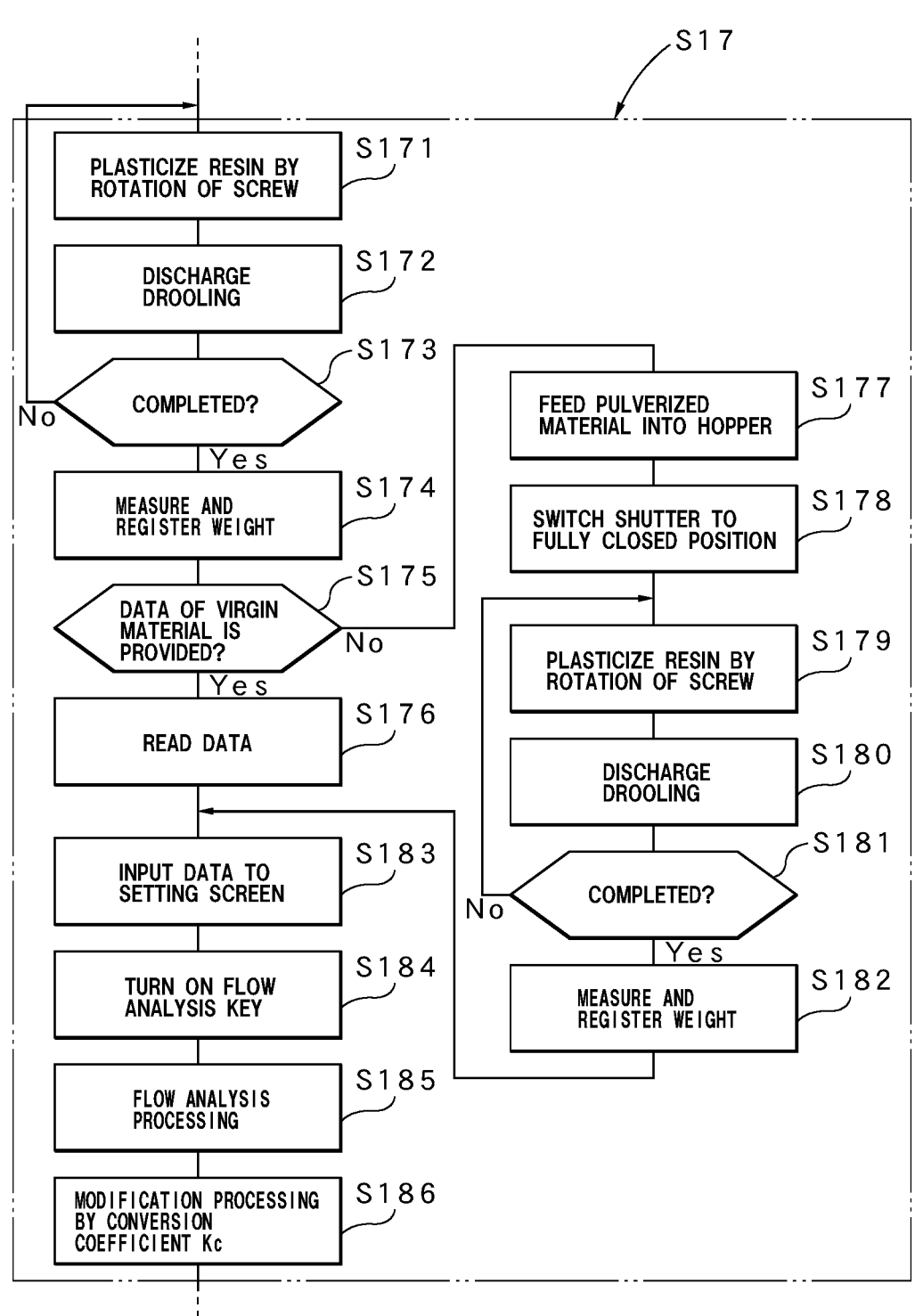
FIG. 9 is a flowchart showing a processing procedure of a method for supporting the molding of a pulverized material resin material according to a modified embodiment of the present invention.

A method for modifying the molding condition when the pulverized material resin material Q in which the pulverized material Qc and the virgin material Qp are mixed is used will be described below with reference to FIGS. 7 and 11 to 13 according to a flowchart shown in FIG. 9 (and FIG. 1).

Figure 1:
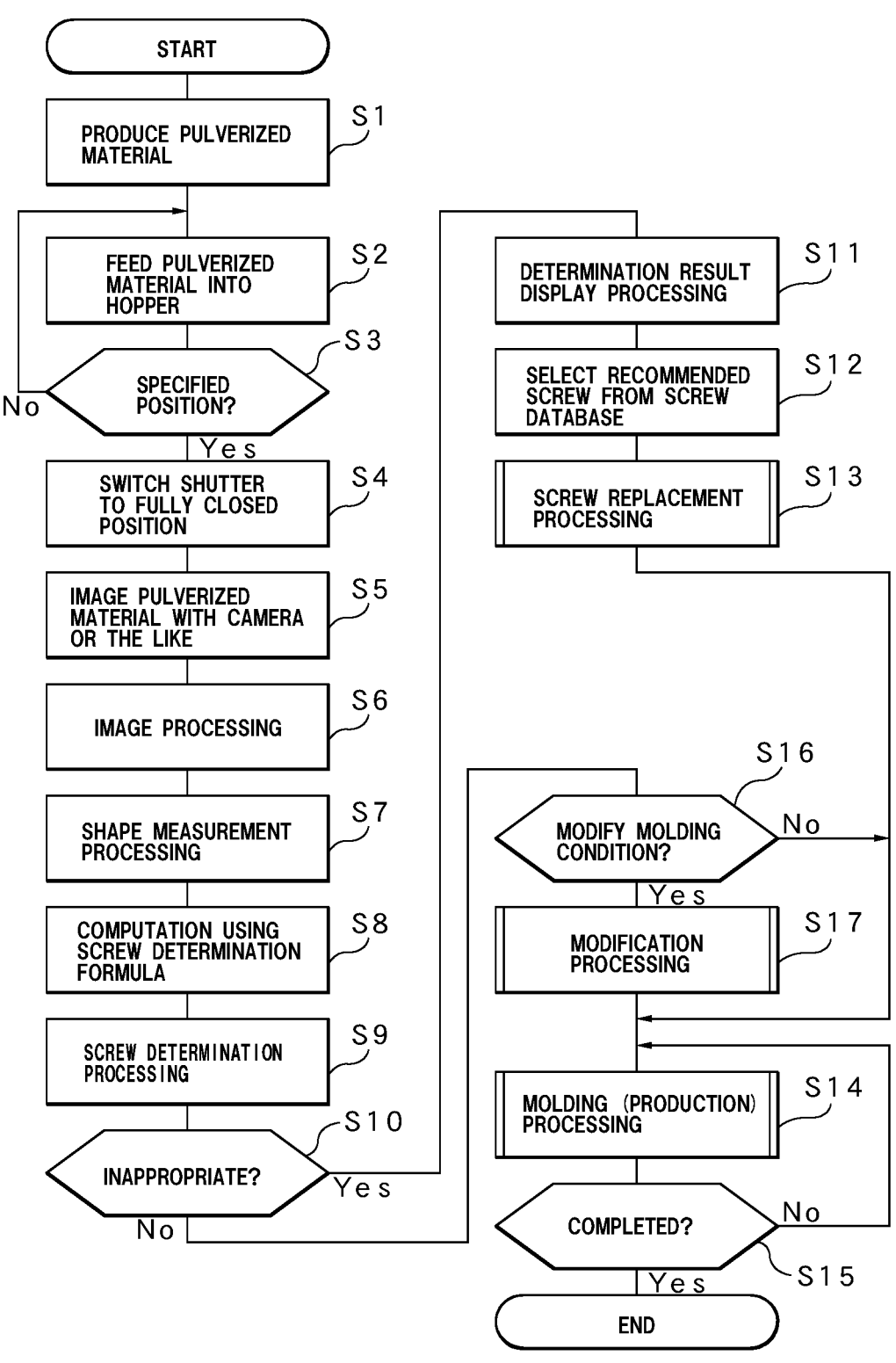
FIG. 1 is a flowchart showing a processing procedure of a method for supporting the molding of a pulverized material resin material according to a preferred embodiment of the present invention.

Here, a case where the injection molding machine M is in a state shown in FIG. 7, that is, in a state where in step S4 of FIG. 1, the shutter 6 is switched to the fully closed position is assumed. In this case, a constant volume Vq of the pulverized material Qc is filled from the lower surface of the shutter 6 into the material drop opening 2d and further from the lower end opening of the material drop opening 2d in a certain range of the screw 3 located below, and thus this state is a state where the constant volume Vq of the pulverized material Qc is measured.

Figure 13:
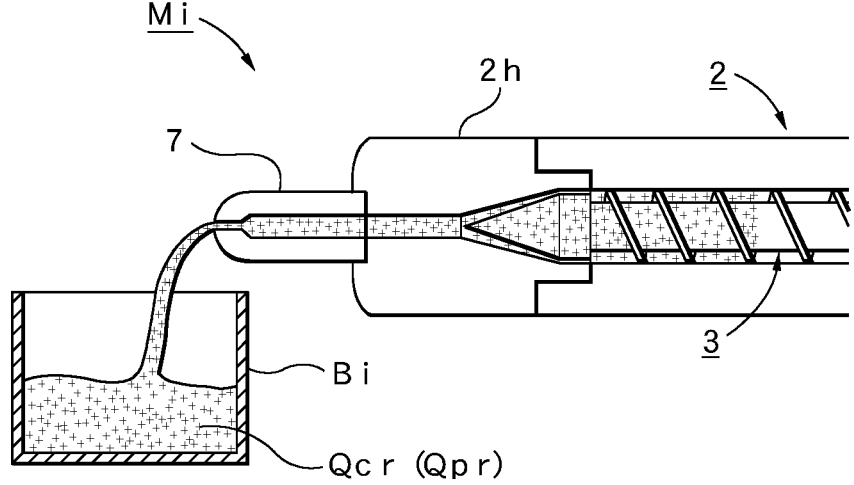
FIG. 13 is a step illustrative diagram for the molding supporting method according to the modified embodiment.

When in this state, the screw 3 is rotated, as shown in FIG. 13, the pulverized material Qc is fed forward and is plasticized by the heating tube 2 heated with the heating group portion 9 including the heating portion 9r and the like (steps S17 and S171). Then, the molten resin Qcr which is plasticized is brought into a drooling state and is discharged from a tip end of the nozzle 7 to the outside (step S172).

This discharge step is continued until all the molten resin Qcr is discharged from the tip end of the nozzle 7 (step S173). On the other hand, the molten resin Qcr which is discharged is received by a container Bi which is set, and when the discharge is completed, the weight [g] related to the amount of drooling is measured. The container Bi may also serve as, for example, a weight scale. Then, the amount of drooling which is measured is registered as the pulverized material bulk density data Dc (step S174).

Then, the amount of drooling (bulk density) related to the virgin material Qp is acquired (step S175). In this case, when data related to the amount of drooling (bulk density) in the virgin material Qp has already been registered, the data is read (step S176). On the other hand, when the data has not been registered, a measurement can be made as with the measurement of the pulverized material Qc described above. Specifically, the virgin material (pellets) Qp is fed into the hopper 5 in which the shutter 6 is in the fully opened position, and when the upper surface of the virgin material Qp fed reaches at least a position above the shutter 6, the shutter 6 is switched to the fully closed position (steps S177 and S178). Thereafter, the screw 3 is rotated, and thus the virgin material Qp is fed forward and is plasticized by the heating tube 2, and the molten resin Qcr in the drooling state which is plasticized is discharged from the nozzle 7 (steps S179 and S180). Then, when all the molten resin Qcr is discharged, the weight [g] related to the amount of drooling is measured, and the amount of drooling measured is registered as the virgin material bulk density data Dp (steps S181 and S182).

As described above, when the measurement of the bulk density (loose bulk density) is performed, the function of the molding machine M is utilized to perform the measurement, and thus it is not necessary to additionally prepare a large-scale measurement device and the like, with the result that this method can be performed at low cost even at a small-scale production plant or the like. Specifically, the injection molding machine M which is used in the actual production and is owned by the user can be directly utilized, with the result that the user can make the measurement more easily and rapidly by the operation of the injection molding machine M itself.

Figure 12:
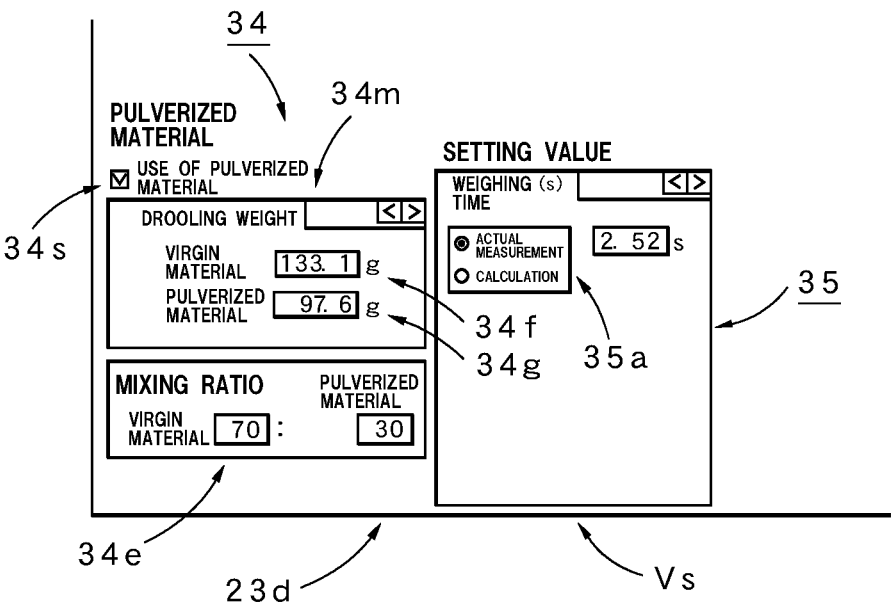
FIG. 12 is a setting screen diagram showing only an extracted part of a display in the molding supporting method according to the modified embodiment.

Since in the measurement step described above, the bulk densities (amounts of drooling) of the virgin material Qp and the pulverized material Qc are obtained, data input is performed in the pulverized material setting column 34 on the setting screen Vs shown in FIG. 12 (step S183). FIG. 12 shows a state where the pulverized material setting column 34 on the setting screen Vs shown in FIG. 4 is switched to the display of a drooling weight input unit 34m, and the drooling weight input unit 34m includes: a virgin material weight input unit 34f and a pulverized material weight input unit 34g to which drooling weights are input; and a mixing ratio input unit 34e to which the mixing ratio of the virgin material Qp and the pulverized material Qc is input.

As an example, a case is shown where, as the drooling weight [g] of the virgin material Qp, "133.1" is input to the virgin material weight input unit 34f, and as the drooling weight [g] of the pulverized material Qc, "92.6" is input to the pulverized material weight input unit 34g. In this case, the data Dp and Dc registered may be reflected (transferred) onto the setting screen Vs without being processed. Furthermore, the mixing ratio (weight ratio) of the virgin material Qp and the pulverized material Qc is input to the mixing ratio input unit 34e. FIG. 12 shows as example where, as the mixed amount [%] of virgin material Qp, "70" is input and as the mixed amount [%] of pulverized material Qc, "30" is input.

Incidentally, when the pulverized material Qc and the virgin material Qp are mixed to be used, the bulk densities of the virgin material Qp and the pulverized material Qc are previously measured, based on the pulverized material bulk density data Dc related to the bulk density of the pulverized material Qc and the virgin material bulk density data Dp related to the bulk density of the virgin material Qp obtained by the measurement, the conversion coefficient Kc for the predetermined molding condition when the virgin material Qp and the pulverized material Qc are mixed in the predetermined ratio is determined and registered. When the pulverized material Qc is used, at least the bulk density of the pulverized material Qc which is used is measured and based on the pulverized material bulk density data Dc, the virgin material bulk density data Dp obtained by the measurement, and the conversion coefficient Kc, the processing for modifying the molding condition can be performed. When the modification processing as described above is performed, even if the pulverized material Qc having random particle shapes Qcg and sizes (areas Ac) is mixed with the virgin material Qp to be used, it is possible to avoid insufficient melting and variations to stabilize the molten state of the resin. In this way, it is possible to enhance and uniformize the molding quality, to further reduce molding failures and to stabilize production without the occurrence of a production delay. Moreover, for example, even a user who does not have specialized knowledge can easily perform this method.

Figure 11:
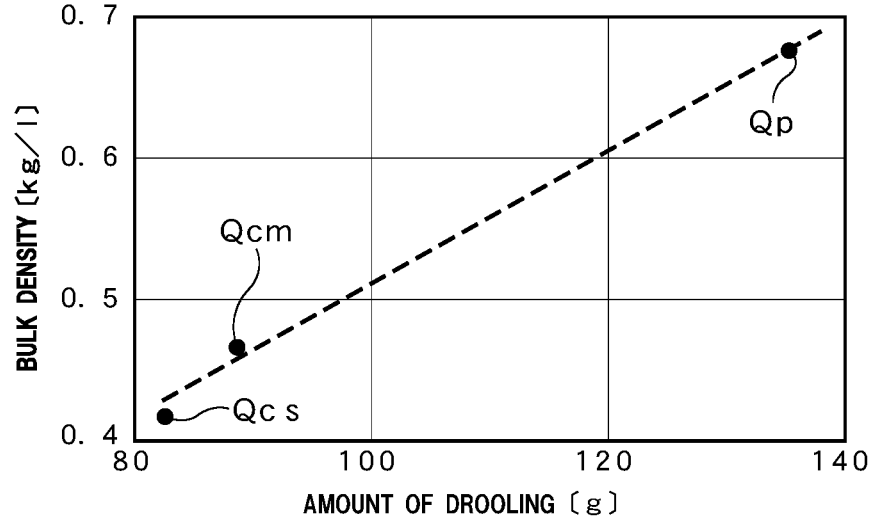
FIG. 11 is a correlation characteristic chart of the amount of drooling and a loose bulk density in the pulverized material and the virgin material used in the molding supporting method according to the modified embodiment.

The principle of performing the processing for modifying the molding condition is as follows. FIG. 11 shows a relationship between the amounts of drooling [g] of the pulverized materials Qcm, Qcs and the virgin material (pellets) Qp shown in FIGS. 10(a) to 10(c) and the loose bulk density [kg/liter]. As shown in FIG. 11, it can be confirmed that there is a sufficient correlation between the amounts of drooling obtained by the measurement and the loose bulk density.

Hence, as a relatively simple method, the conversion coefficient Kc is set, the predetermined molding condition (setting value) is multiplied by the conversion coefficient Kc and thus it is possible to easily modify the predetermined molding condition. The molding condition is a concept which includes not only a setting condition value set before molding but also, for example, a monitor value for grasping whether or not the state of molding after molding is satisfactory.

In the case of the plasticization time serving as an example of the molding condition, when the loose bulk density (amount of drooling) of the virgin material Qp and the loose bulk density (amount of drooling) of the pulverized material Qc are known, the conversion coefficient Kc can be determined by "Kc=(bulk density of virgin material Qp)/(bulk density of pulverized material Qc)". In this way, when the mixing ratio of the pulverized material Qc to the virgin material Qp is clarified, by the degree of the mixing ratio, it is possible to modify the plasticization time based on the loose bulk densities (amounts of drooling [g]) of the virgin material Qp and the pulverized material Qc determined with the injection molding machine M described above, that is, the conversion coefficient Kc.

Specifically, since the plasticization time only for the virgin material Qp can be determined by the flow analysis processing program Ps described above, the loose bulk density (amount of drooling) of the virgin material Qp and the loose bulk density (amount of drooling) of the pulverized material Qc are measured, and thus the conversion coefficient Kc described above is determined, and based on the mixing ratio of the virgin material Qp and the pulverized material Qc, it is possible to predict a plasticization time Tms when the pulverized material Qc is mixed to be used. In other words, when the plasticization time only for the virgin material Qp is assumed to be Tm, the plasticization time Tms serving as a predicted value can be obtained by "Tms=Tm×Kc".

Since the conversion coefficient Kc is changed by the area Ac of the particle shape Qcg of the pulverized material Qc in one direction, the dimension, the shape of the screw and the like, the conversion coefficient Kc is corrected by these forms, the amount of correction is adjusted as necessary by an experiment or the like and the optimized conversion coefficient Kc is registered. As described above, the conversion coefficient Kc is corrected by one or two or more of the area Ac of the pulverized material Qc, the dimension (Vc, Wc) of the pulverized material Qc and the shape of the screw 3, and thus the conversion coefficient Kc can be finely adjusted by physical elements which are easily affected, with the result that it is possible to further optimize the molding conditions or molding conditions related thereto in terms of fine adjustment. In particular, the area Ac of the pulverized material Qc, the dimension (Vc, Wc) of the pulverized material Qc and the shape of the screw 3 are data which are previously obtained by performing the molding supporting method according to the present embodiment, and thus they can be effectively utilized without being processed.

Then, when the data input is completed on the setting screen Vs, the flow analysis start key 36 is turned on (step S184). In this way, the flow analysis processing program Ps is started up, and the flow analysis processing is performed (step S185). In the flow analysis processing, the molding support devices for injection molding machines which have already been proposed by the present applicant (see Japanese Unexamined Patent Application Publication Nos. 2020-1183 and 2021-121959) can be utilized. Specifically, accurate information (data) on the molten state of the resin material can be numerically estimated by an estimation processing function, and in particular, it is possible to obtain an estimated solid phase rate, an estimated resin decomposition rate and an estimated breakage rate of a reinforcing fiber and further obtain the plasticization time and the amount of heat generation based on these rates.

Basically, in the flow analysis processing, for at least the molding condition for the virgin material Qp and in particular, in the illustrated case, for the purpose of obtaining the plasticization time and the amount of heat generation, modification processing in a case where the pulverized material Qc is mixed to be used is performed (step S186). In this case, the plasticization time is multiplied by the conversion coefficient Kc to determine a modified value, and the amount of heat generation is multiplied by the conversion coefficient Kc to determine a modified value. Each of the conversion coefficient Kc for the plasticization time and the conversion coefficient Kc for the amount of heat generation is individually set.

Although the plasticization time is described as an example of the predetermined molding condition, other molding conditions such as the amount of heat generation which is more likely to be significantly affected by the loose bulk density of the pulverized material Qc can likewise be modified. The predetermined molding condition includes at least one or both of the plasticization time and the amount of heat generation, and thus the plasticization time and the amount of heat generation which are more likely to be significantly affected by the pulverized material Qc having random particle shapes and sizes can be modified, with the result that it is possible to easily optimize these molding conditions or molding conditions related thereto. The molding condition is a concept which includes not only a setting condition value set before molding but also, for example, a monitor value for grasping whether or not the state of molding after molding is satisfactory.

As described above, a so-called predicted value obtained by modifying the molding condition for the virgin material Qp by the conversion coefficient Kc with consideration given to the bulk density can be predicted as a value close to the actual measured value, and can be practically utilized at the production site. For the amount of heat generation described above, a measurement device which measures the temperature of the resin discharged to the mold C is used, and a difference between the maximum resin temperature at the time of discharge and a setting temperature is assumed to be the amount of heat generation.

Although the preferred embodiment has been described in detail above, the present invention is not limited to the embodiment as described above, the detailed configurations, the shapes, the ingredients, the materials, the numbers, the values, the methods and the like can be arbitrarily changed, added and deleted without departing from the spirit of the present invention.

For example, although the example is described where the area Ac is measured by imaging the particle shape Qcg of the pulverized material Qc with the imaging unit 4 and performing the image processing on the image signal obtained from the imaging unit 4, a measurement device other than the injection molding machine M or the like may be utilized to make the measurement, a method other then the image processing may be used to make the measurement and in short, a configuration in which the area Ac of the particle shape Qcg can be measured is preferably adopted. Although the example is described where the pulverized material shape index Ki is determined by the screw determination formula described above, the pulverized material shape index Ki may be determined by another computation formula. On the other hand, when the result of the determination is inappropriate, it is desirable to display the appropriate condition of the screw 3 together with the result of the determination but it is not an essential requirement. The pulverized material resin material Q in which the virgin material Qp and the pulverized material Qc are mixed in the predetermined ratio does not mean that only the virgin material Qp and the pulverized material Qc are mixed, it is sufficient to include the virgin material Qp and the pulverized material Qc and another material may be included in addition to the virgin material Qp and the pulverized material Qc. In this case, the predetermined ratio includes a case where the virgin material Qp is "0". On the other hand, a modified embodiment in which the molding condition is modified is not an essential requirement and can be performed as necessary. In this case, the conversion coefficient Kc may be a coefficient of a simple value or may be a coefficient including a variable and a formula. Furthermore, although as the bulk density, the loose bulk density is preferably used, a bulk density under a certain condition, for example, in which a predetermined pressure is applied to compress the volume may be used. On the other hand, although it is preferable to utilize the function of the molding machine M to measure the bulk density, another measurement device having a similar function may be used to measure the bulk density. When the molding machine M is utilized, the pulverized material Qc or the virgin material Qp is fed into the hopper 5 of the molding machine M and is fed at least to a position of the hopper 5 above the shutter 6, then the shutter 6 is closed and thereafter the screw 3 is rotated to be able to measure the weight of the resin Qpr, Qcr in the drooling state discharged from the nozzle 7. However, the pulverized material Qc or the virgin material Qp the volume of which is measured with a container such as a measure may be fed into the hopper 5. Although as the predetermined molding condition, the plasticization time and the amount of heat generation are described as examples, another molding condition can likewise be applied.

INDUSTRIAL APPLICABILITY

A method for supporting the molding of a pulverized material resin material according to the present embodiment can be utilized for various types of injection molding machines that plasticize and injection-mold a pulverized material resin material including a pulverized material as at least a part, and can also be utilized as various types of injection molding methods.

REFERENCE SIGNS LIST

2: heating tube, 3: screw, 4: imaging unit, Q: pulverized material resin material, Qc: pulverized material, Qcg: particle shape of pulverized material, Qp: virgin material, Ac: area of particle shape in one direction, Gs: screw groove, Ds: depth of screw groove, Ki: pulverized material shape index, Vc: dimension (vertical dimension) of pulverized material, Wc: dimension (lateral dimension) of pulverized material

CITATION LIST

Patent Literature 1: Japanese Unexamined Patent Application Publication No. 2007-125818
Patent Literature 2: Japanese Unexamined Patent Application Publication No. H7(1995)-304038

The invention claimed is:

1. A method for supporting molding of a pulverized material resin material, the method comprising the steps of:

plasticizing and injection-molding a pulverized material resin material including a pulverized material as at least a part by rotating a screw inserted in a heating tube;

before use of the pulverized material, measuring an area of a particle shape of the pulverized material in one direction;

determining a pulverized material shape index indicating a relative size of the area with respect to a depth of a screw groove by computation processing; and when a size of the pulverized material shape index is equal to or greater than a preset setting value, determining the screw to be inappropriate, and displaying at least a result of the determination.

2. The method for supporting molding of a pulverized material resin material according to claim 1, further comprising the steps of:

measuring the area by imaging the particle shape of the pulverized material with an imaging unit; and performing image processing on an image signal obtained from the imaging unit.

3. The method for supporting molding of a pulverized material resin material according to claim 1, further comprising the step of determining the pulverized material shape index by a screw determination formula of [Formula 1], where Ac is the area of the particle shape of the pulverized material, σ is a standard deviation of the area Ac and Ds is the depth of the screw groove, $$Ki = \frac{\sqrt{Ac + 3\sigma}}{Ds} \ldots \text{[Screw determination formula]}. \qquad \text{[Formula 1]}$$

4. The method for supporting molding of a pulverized material resin material according to claim 1, further comprising the step of displaying an appropriate condition of the screw together with the result of the determination when the result of the determination is inappropriate.

5. The method for supporting molding of a pulverized material resin material according to claim 1, further comprising the step of mixing the pulverized material with a virgin material in a predetermined ratio to be used.

6. The method for supporting molding of a pulverized material resin material according to claim 5, further comprising the steps of:

previously measuring bulk densities of the virgin material and the pulverized material when the pulverized material and the virgin material are mixed to be used;

based on pulverized material bulk density data related to the bulk density of the pulverized material and virgin material bulk density data related to the bulk density of the virgin material obtained by the measurement, determining and registering a conversion coefficient for a predetermined molding condition when the virgin material and the pulverized material are mixed in the predetermined ratio;

when the pulverized material is used, measuring at least a bulk density of the pulverized material which is used; and based on the pulverized material bulk density data, the virgin material bulk density data and the conversion coefficient obtained by the measurement, performing processing for modifying the molding condition.

7. The method for supporting molding of a pulverized material resin material according to claim 6, further comprising the step of performing the measurement of the bulk density by utilizing a function of a molding machine.

8. The method for supporting molding of a pulverized material resin material according to claim 6, further comprising the step of correcting the conversion coefficient by an area of the pulverized material.

9. The method for supporting molding of a pulverized material resin material according to claim 6, further comprising the step of correcting the conversion coefficient by a dimension of the pulverized material.

10. The method for supporting molding of a pulverized material resin material according to claim 6, further comprising the step of correcting the conversion coefficient by a shape of the screw.

* * * * *